US00RE36817E

United States Patent [19]

Pastusek et al.

[11] E Patent Number: Re. 36,817

[45] Reissued Date of Patent: Aug. 15, 2000

[54] METHOD AND APPARATUS FOR DRILLING AND ENLARGING A BOREHOLE

[75] Inventors: Paul E. Pastusek, The Woodlands, Tex.; Corey S. Thayn, Lehi, Utah

[73] Assignee: Baker Hughes Incorporated, Houston, Tex.

[21] Appl. No.: 09/041,519

[22] Filed: Mar. 12, 1998

Related U.S. Patent Documents

Reissue of:

[64] Patent No.: 5,497,842
Issued: Mar. 12, 1996
Appl. No.: 08/431,510
Filed: Apr. 28, 1995

[51] Int. Cl.[7] ..... E21B 9/24

[52] U.S. Cl. ..... 175/334; 175/391; 175/398

[58] Field of Search ..... 175/385, 391, 175/398, 399, 408, 334

[56] References Cited

U.S. PATENT DOCUMENTS

| | | | |
|---|---|---|---|
| 3,945,447 | 3/1976 | Peterson | 175/334 X |
| 4,031,974 | 6/1977 | Peterson | 175/334 |
| 4,102,416 | 7/1978 | Hug | 175/334 |
| 4,635,738 | 1/1987 | Schillinger et al. . | |
| 4,706,765 | 11/1987 | Lee et al. | 175/334 |
| 4,989,681 | 2/1991 | Lohmuller et al. | 175/398 |
| 5,009,271 | 4/1991 | Maric et al. . | |
| 5,052,503 | 10/1991 | Lof . | |
| 5,165,494 | 11/1992 | Barr . | |
| 5,259,469 | 11/1993 | Stjernstrom et al. . | |

OTHER PUBLICATIONS

Hughes Christensen Company drawings (3 pages) for a bi–center bit, Sep. 22, 1992.

*Primary Examiner*—Frank Tsay
*Attorney, Agent, or Firm*—Trask, Britt & Rossa

[57] ABSTRACT

A reaming apparatus for enlarging a borehole, including a tubular body having one or more longitudinally and generally radially extending blades circumferentially spaced thereabout. Each of the blades carries highly exposed cutting elements, on the order of fifty percent exposure, on its profile substantially all the way to the gage. At least one of the blades is a primary blade for cutting the full or drill diameter of the borehole, while one or more others of the blades may be secondary blades which extend a lesser radial distance from the body than the primary blade. A secondary blade initially shares a large portion of the cutting load with the primary blade while the borehole size is in transition between a smaller, pass through diameter and drill diameter. It functions to enhance the rapidity of the transition while balancing side reaction forces, and reduces vibration and borehole eccentricity. After drill diameter is reached, cutting elements on the secondary blade continue to share the cutting load over the radial distance they extend from the body.

75 Claims, 4 Drawing Sheets

METHOD AND APPARATUS FOR DRILLING AND ENLARGING A BOREHOLE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to enlarging the diameter of a subterranean borehole, and more specifically to enlarging the borehole below a portion thereof which remains at a lesser diameter.

2. State of the Art

It is known to employ both eccentric and bi-center bits to enlarge a borehole below a tight or undersized portion thereof.

An eccentric bit includes an extended or enlarged cutting portion which, when the bit is rotated about its axis, produces an enlarged borehole. An example of an eccentric bit is disclosed in U.S. Pat. No. 4,635,738.

A bi-center bit assembly employs two longitudinally-superimposed bit sections with laterally offset axes. The first axis is the center of the pass through diameter, that is, the diameter of the smallest borehole the bit will pass through. This axis may be referred to as the pass through axis. The second axis is the axis of the hole cut as the bit is rotated. This axis may be referred to as the drilling axis. There is usually a first, lower and smaller diameter pilot section employed to commence the drilling, and rotation of the bit is centered about the drilling axis as the second, upper and larger diameter main bit section engages the formation to enlarge the borehole, the rotational axis of the bit assembly rapidly transitioning from the pass through axis to the drilling axis when the full diameter, enlarged borehole is drilled.

Rather than employing a one-piece drilling structure such as an eccentric bit or a bi-center bit to enlarge a borehole below a constricted or reduced-diameter segment, it is also known to employ an extended bottomhole assembly (extended bi-center assembly) with a pilot bit at the distal end thereof and a reamer assembly some distance above. This arrangement permits the use of any standard bit type, be it a rock bit or a drag bit, as the pilot bit, and the extended nature of the assembly permits greater flexibility when passing through tight spots in the borehole as well as the opportunity to effectively stabilize the pilot bit so that the pilot hole and the following reamer will traverse the path intended for the borehole. This aspect of an extended bottomhole assembly is particularly significant in directional drilling.

While all of the foregoing alternative approaches can be employed to enlarge a borehole below a reduced-diameter segment, the pilot bit with reamer assembly has proven to be the most effective overall. The assignee of the present invention has, to this end, designed as reaming structures so-called "reamer wings" in the very recent past, which reamer wings generally comprise a tubular body having a fishing neck with a threaded connection at the top thereof, and a tong die surface at the bottom thereof, also with a threaded connection. The upper mid-portion of the reamer wing includes one or more longitudinally-extending blades projecting generally radially outwardly from the tubular body, the outer edges of the blades carrying superabrasive (also termed superhard) cutting elements, commonly termed PDC's (for Polycrystalline Diamond Compact). The lower mid-portion of the reamer wing may include a stabilizing pad having an arcuate exterior surface of the same or slightly smaller radius than the radius of the pilot hole on the exterior of the tubular body and longitudinally below the blades. The stabilizer pad is characteristically placed on the opposite side of the body with respect to the reamer blades so that the reamer wing will ride on the pad due to the resultant force vector generated by the cutting of the blade or blades as the enlarged borehole is cut. The aforementioned reamer wing as described and as depicted herein is not acknowledged or admitted to constitute prior art to the invention described and claimed herein.

While the aforementioned reamer wing design has enjoyed some success, it has been recognized by the invention herein that the device, as presently constructed, may not effectively and efficiently address the problem or task of achieving a rapid transition from pass through to full hole or "drill" diameter which closely tracks the path of the pilot bit and which does not unduly load the blades or bottomhole assembly during the transition. Since the reamer wing may have to re-establish a full diameter borehole multiple times during its drilling life in a single borehole, due to washouts and doglegs of the pilot hole, rapid transitioning ability when reaming is restarted as well as a robust design which can accommodate multiple transitions without significant damage is desirable.

SUMMARY OF THE INVENTION

The present invention comprises a reamer wing having one or more blades, at least one of which comprises a primary blade for cutting the full diameter of an enlarged borehole and another of which may comprise a secondary blade for enhancing the transition from the pass through diameter to the enlarged full diameter cut by the primary blade.

More specifically, the invention includes at least a body having a longitudinally-extending primary blade extending generally radially therefrom, the radial extent of the primary blade substantially defining the gage of the enlarged borehole to be cut by the reamer wing, and an optional, longitudinally-extending secondary blade circumferentially spaced from the primary blade and having a radial extent of less than that of the primary blade as measured from the drilling axis. The blades carry cutting elements along the outer edges or profiles thereof, the cutting elements extending from proximate the body to the outermost extent of the blade. Moreover, the cutting elements are substantially exposed on the order of one-half of their cutting face height all the way up the flank of the blades to, and optionally including, the gage. At least some of the cutting elements are also aggressively raked relative to conventional, prior art rakes, to promote engagement with the formation. Thus, the cutting elements as positioned and exposed cut away the formation to an extent that the gage pads on the main blade or blades do not have to cut laterally. Alternatively, contentional gage pads without cutting elements may be completely eliminated and cutting elements may be placed along the entire gage extent of one or more blades.

In such a manner, when multiple blades are employed, the loading of certain cutting elements on the blades can be shared, and the cutting elements at the flank and shoulder of the secondary blade accelerate the removal of formation material while minimizing side reaction forces, to speed the transition of the primary blade to its full-diameter reaming task in rotating about the drilling axis of the reamer wing.

The invention also contemplates a method of enlarging a borehole by rotating a body carrying first and second radially-extending cutting means thereon, and engaging the borehole with the first cutting means extending to a first radius from a rotational center for the diameter of the enlarged borehole and subsequently engaging the borehole with the second cutting means extending to a second radius from the drilling axis substantially equal to one-half of drill diameter.

DETAILED DESCRIPTION OF THE PREFERRED EMBODIMENT

Figure 1:
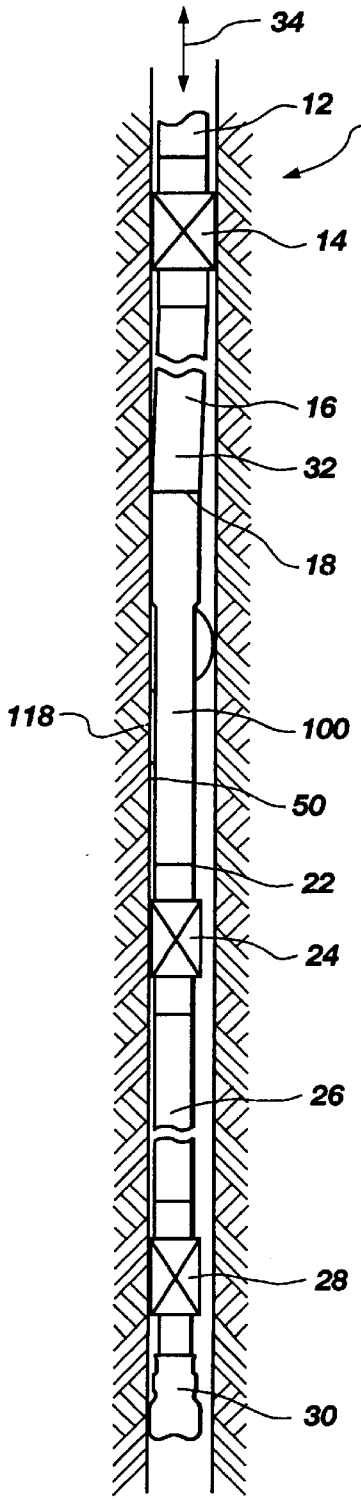
FIGS. 1 through 3 comprise schematic partial sectional elevations of a bottomhole assembly including a reamer wing as employed in one aspect of the present invention, the bottomhole assembly being shown in pass through condition (FIG. 1), in start up condition (FIG. 2) and in a normal drilling mode for enlarging the borehole (FIG. 3)
Figure 2:
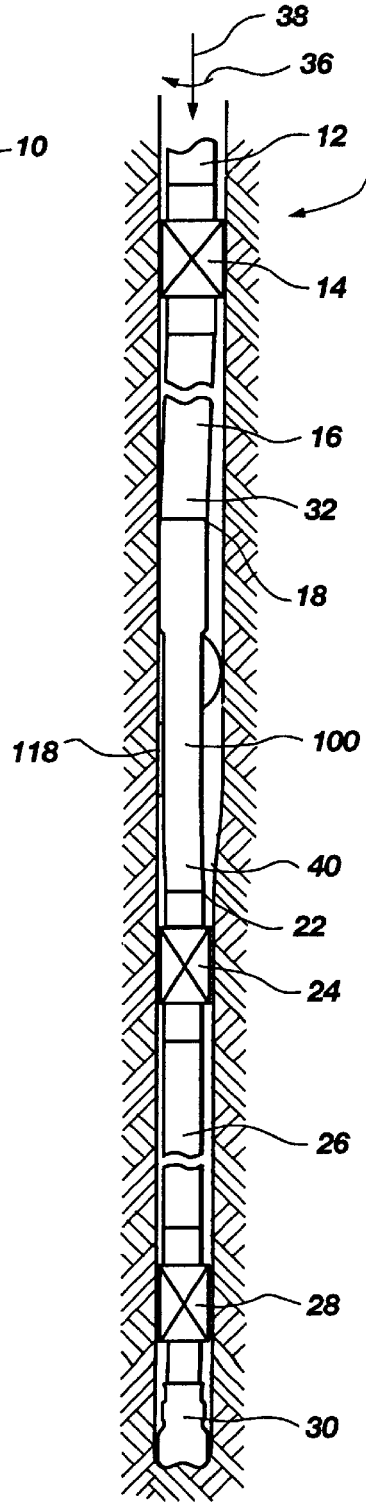
Figure 3:
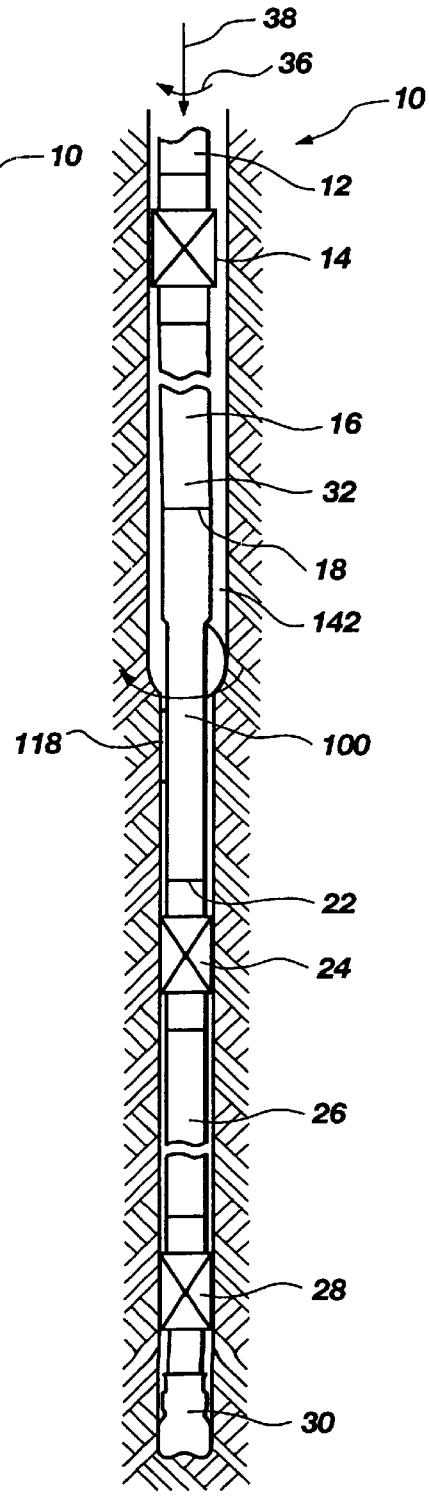

FIGS. 1 through 3 depict an exemplary bi-center bottomhole assembly 10 in which the reamer wing of the present invention may be employed.

Commencing with FIG. 1 and moving from the top to the bottom of the assembly 10, one or more drill collars 12 are suspended from the distal end of a drill string extending to the rig floor at the surface. Pass through stabilizer (optional) 14 is secured to drill collar 12, stabilizer 14 being sized equal to or slightly smaller than the pass through diameter of the bottomhole assembly 10, which may be defined as the smallest diameter borehole through which the assembly may move longitudinally. Another drill collar 16 (or other drill string element such as an MWD tool housing or pony collar) is secured to the bottom of stabilizer 14, below which reamer wing 100 according to the present invention is secured via tool joint 18, which may be a 6⅝inch API joint. Another API joint 22, for example a 4½inch API joint, is located at the bottom of the reamer wing 100. Upper pilot stabilizer 24, secured to reamer wing 100, is of an O.D. equal to or slightly smaller than that of the pilot bit 30 at the bottom of the assembly 10. Yet another, smaller diameter drill collar 26 is secured to the lower end of pilot stabilizer 24, followed by a lower pilot stabilizer 28 to which is secured pilot bit 30. Pilot bit 30 may be either a rotary drag bit or a tri-cone, so-called "rock bit". The bottomhole assembly 10 as described is exemplary only, it being appreciated by those of ordinary skill in the art that many other assemblies and variations may be employed.

It should be noted that there is an upper lateral displacement 32 between the axis of pass through stabilizer 14 and that of reamer wing 100, which displacement is provided by the presence of drill collar 16 therebetween and which promotes passage of the assembly 10, and particularly the reamer wing 100, through a borehole segment of the design pass through diameter.

For purposes of discussion, the following exemplary dimensions may be helpful in understanding the relative sizing of the components of the assembly for a particular pass through diameter, pilot diameter and drill diameter. For a pass through diameter of 10.625 inches, a pilot diameter of 8.500 inches and a maximum drill diameter of 12.250 inches (the full bore diameter drilled by reamer wing 100) would normally be specified. In the bottomhole assembly 10, for the above parameters:

(a) drill collar 12 may be an eight inch drill collar;

(b) drill collar 16 may be a thirty foot, eight inch drill collar;

(c) drill collar 26 may be a fifteen foot, 6¾inch drill collar; and (d) pilot bit 30 may be an 8½inch bit.

In pass through condition, shown in FIG. 1, the assembly 10 is always in either tension or compression, depending upon the direction of travel, as shown by arrow 34. Contact of the assembly 10 with the borehole wall 50 is primarily through pass through stabilizer 14 and reamer wing 100. The assembly 10 is not normally rotated while in pass through condition.

FIG. 2 depicts the start-up condition of assembly 10, wherein assembly 10 is rotated by application of torque as shown by arrow 36 as weight-on-bit (WOB) is also applied to the string, as shown by arrow 38. As shown, pilot bit 30 has drilled ahead into the uncut formation to a depth approximating the position of upper pilot stabilizer 24, but reamer wing 100 has yet to commence enlarging the borehole to drill diameter. As shown at 32 and at 40, the axis of reamer wing 100 is laterally displaced from those of both pass through stabilizer 14 and upper pilot stabilizer 24. In this condition, the reamer wing 100 has not yet begun its transition from being centered about a pass through center line to its drilling mode center line which is aligned with that of pilot bit 30.

FIG. 3 depicts the normal drilling mode of bottomhole assembly 10, wherein torque 36 and WOB 38 are applied and, upper displacement 32 may remain as shown, but generally is eliminated under all but the most severe drilling conditions. Lower displacement 40 has been eliminated as reamer wing 100 is rotating about the same axis as pilot bit 30 in cutting the borehole to full drill diameter.

It is the rapidity and efficiency of the transition from start up as shown in FIG. 2 to normal drilling as shown in FIG. 3 to which the present invention primarily pertains.

Figure 4:
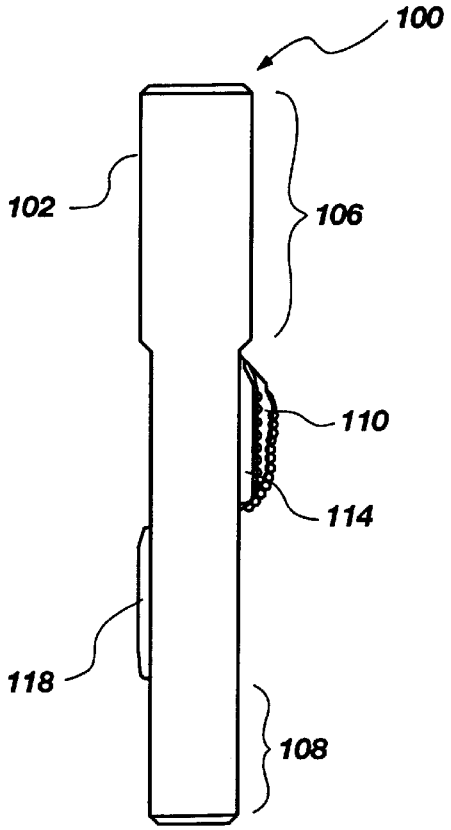
FIG. 4 comprises a side elevation of an exemplary reamer wing in accordance with the present invention.
Figure 6:
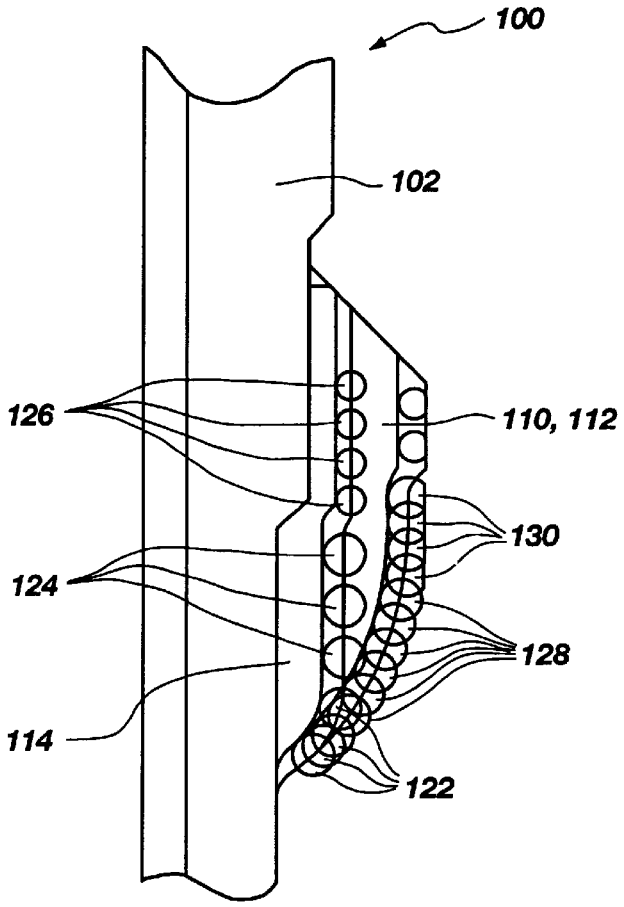
FIG. 6 comprises an enlarged schematic of the profile of the primary and secondary reamer blades of the reamer of FIG. 4, rotated into a single plane about the drilling axis to illustrate cutting element position, exposure and coverage.
Figure 5:
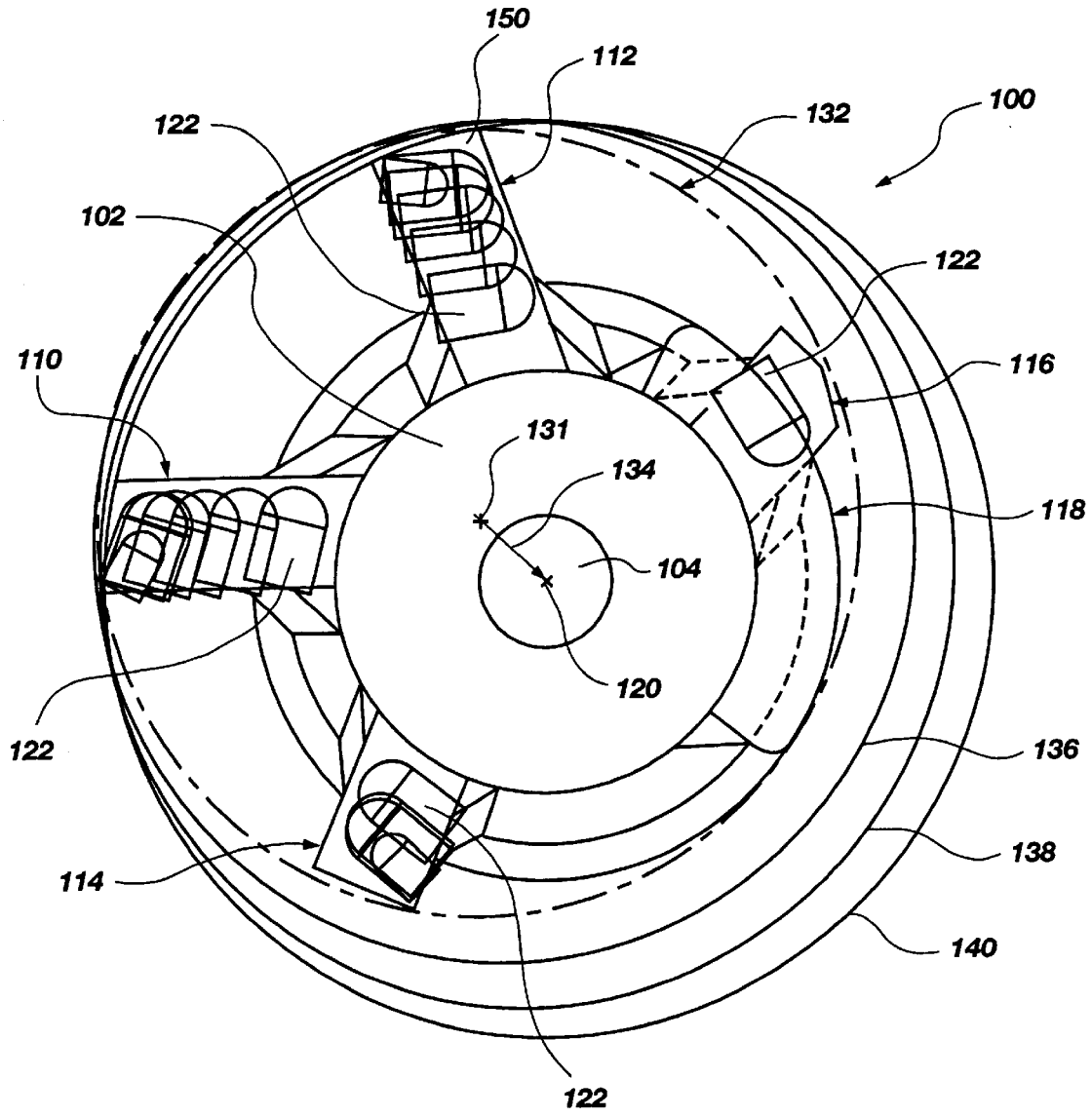
FIG. 5 comprises an enlarged bottom elevation of the reamer wing of FIG. 4.

FIGS. 4, 5 and 6 illustrate exemplary reamer wing 100 according to the present invention in greater detail. Reamer wing 100 comprises a tubular body 102 having an axial bore 104 therethrough. Tubular body 102 includes a fishing neck portion 106 at the upper exterior thereof, and a tong die surface 108 at the lower exterior thereof. Reamer wing 100 is secured in a bottom hole assembly such as 10, described above, via API threaded connections of the type indicated.

Circumferentially-spaced primary blades 110 and 112 and secondary blades 114 and 116 extend longitudinally and generally radially from body 102 on the upper mid-portion thereof. Body 102 and blades 110–116 are preferably formed of steel, and the blades may be integral or welded to the body. It should be noted that the number of blades depicted is exemplary only, and that as many as five or more blades may be employed on a reamer wing according to the invention. The larger the required diameter of the enlarged borehole, the larger number of blades being generally dictated. Depending on the number of blades used, one or more passages (not shown) may extend from bore 104 to the surface of body 102 to direct drilling fluid to the blades and cutting elements thereon via nozzles (not shown), such technology being well known in the drilling art.

Optional stabilizer pad 118 is located on the lower mid-portion of body 102 generally diametrically opposite in location to primary blades 110 and 112 and closely therebelow, as shown in FIG. 4 and 5. Stabilizer pad 118 is provided with an arcuate exterior surface which is of the same or slightly less radius than the radius of the pilot hole drilled by the pilot bit, the radius being measured from the centerline 120 of tubular body 102. Placement of stabilizer pad 118 is dictated by the resultant lateral force vector generated by the blades during transition from start-up condition to and during drilling of the drill diameter hole so that the pad rides on the borehole wall as the blades cut the transition and ultimate drill diameter. If reamer wing 100 is employed with a steerable bottomhole assembly, it is likely that stabilizer pad 118 would be omitted. The exterior of stabilizer pad 118 may be faced with tungsten carbide bricks and/or diamond wear surfaces, as known in the art for conventional stabilizers.

As shown in FIGS. 4–6, primary blades 110 and 112 extend radially outward from drilling axis or centerline 120 a greater distance than secondary blades 114 and 116. Referring to FIG. 6, it can be seen that primary blades 110 and 112 define one profile, and that secondary blade 114 defines a second, more slender profile. Blade 116 is a main blade which has been cut back in lateral extent (see FIG. 5) to fit the pass through diameter. Looking at FIG. 5, it can be seen that both primary and secondary blades carry cutting elements 122 at their lower and radially inner extents which will continue to actively cut after full drill diameter is reached. However, due to the radially smaller extent of the secondary blades, cutting elements 124 and 126 on the flank of secondary blade 114 will only cut during the transition from start up to full drill diameter, after which they will no longer contact the borehole sidewall, at which time cutting elements 128 and 130 on primary blades 110 and 112 will still be active. In other words, a major function of secondary blade 114 and cutting elements 124 and 126 is to effectuate as rapid and smooth transition as possible to full drill diameter by permitting reamer wing 100 to remove more formation material per revolution and with lower side reaction forces and thus less lateral disruption of assembly rotation than if only primary blades were employed.

Referring to FIG. 6, the large degree of exposure of cutting elements 122, 124, 126, 128 and 130 beyond the blade profiles is readily visible, the exposure approximating one-half or 50% of cutting element height. This is in contrast to the prior art, wherein extremely small cutting element exposures were generally employed, and gage-position cutting elements such as 124, 126 and 130, if employed at all, were not exposed above or beyond the blade profile. As shown in FIG. 6, cutting elements 130 along the gage segment of a blade may employ flat cutting edges parallel to the gage. Moreover, the cutting elements of the reamer wing of the invention are set at a reduced negative back rake, such as 20° or even 10°, as opposed to the prior art practice of using a 30° design negative back rake. It is also contemplated that neutral rake cutting elements may be employed, or combinations of positive and negative back rake cutting elements.

Looking specifically to FIG. 5, the various operational stages of reamer wing 100 can be related to pass through and drill diameters, pass through and drill centerlines, and the transition therebetween. Pass through centerline 130 is the centerline of the pass through diameter 132, the smallest diameter through which reamer wing 100 may pass longitudinally. As the bottomhole assembly (such as 10) is placed in operation, with torque and WOB applied, reamer wing 100 is rotated about a centerline which begins to shift from 130 to 120 along transition line 134, which is not stationary but obviously rotates as reamer wing 100 itself rotates. As can readily be seen from FIG. 5, at commencement of rotation the presence of secondary blade 114 provides a balance to the cutting forces acting on reamer wing 100 and thus reduces vibration tendencies and impact on the cutting elements. Circles 136 and 138 illustrate the progression from pass through to drill diameter at the half and three-quarters open stages. Circle 140 illustrates full drill diameter, which is drilled about centerline 120 by primary blades 110 and 112. As can be seen in FIG. 3, during drilling of the drill diameter, stabilizer pad 118 rides against the pilot bit-sized borehole wall below the enlarged borehole segment 142 drilled by primary blades 110 and 112. Also as shown in FIG. 3, while the face and lower flank cutting elements of all the blades are in continuous engagement with the formation, neither of the secondary blades 114 and 116 or any other portion of reamer wing 100, except for the primary blades, 110 and 112 on the same radial plane as the primary blades will normally contact the borehole sidewall during drilling after the borehole is enlarged to drill diameter. While not so readily apparent, it will also be appreciated that trailing primary blade 112 will not be engaged with the formation until drill diameter is reached and the reamer wing 100 is rotating about center-line 120.

Figure 7:
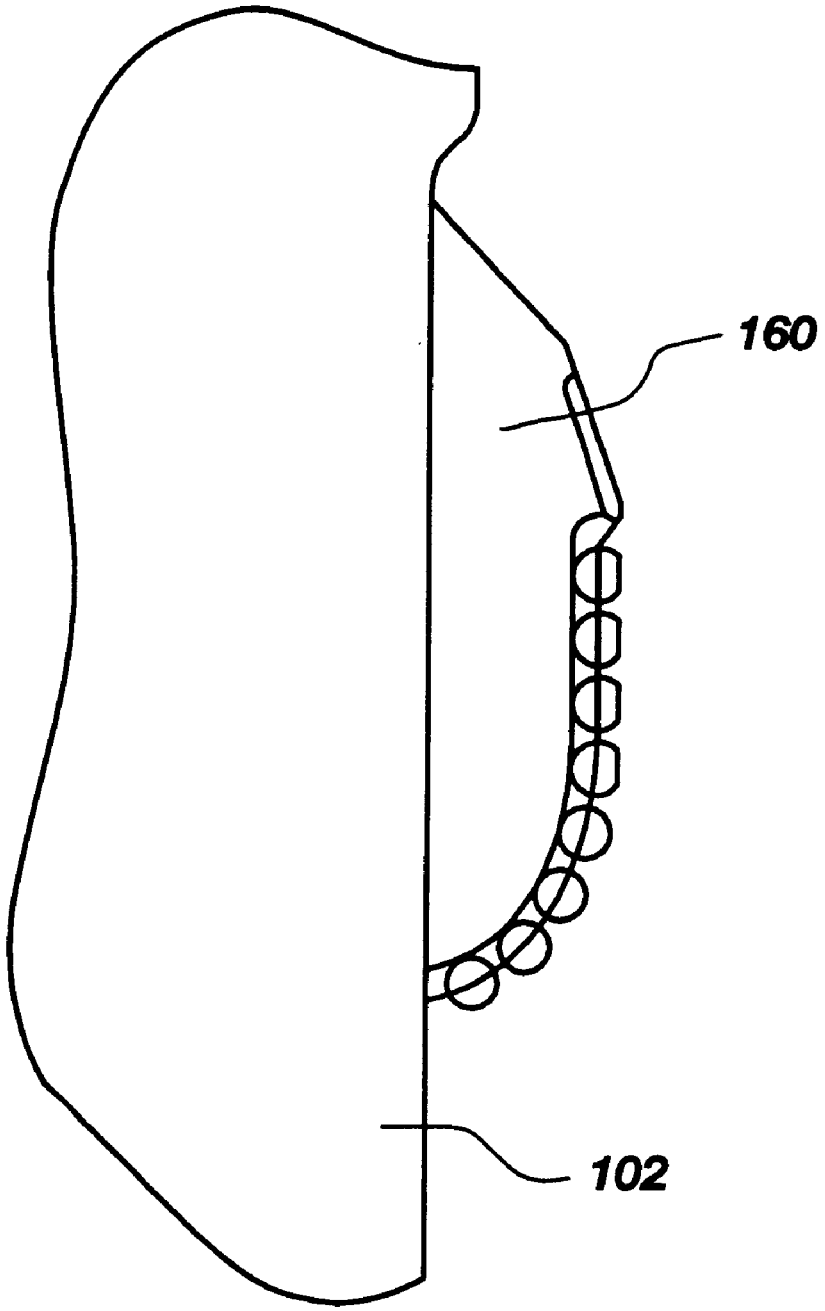
FIG. 7 comprises an enlarged schematic of an alternative blade profile and cutting element disposition according to the present invention.

It is contemplated that other modifications may be made to reamer wing 100 to enhance its effectiveness. For example, neutral or even slightly positive back rake cutting elements may be employed on one or both secondary blades to more rapidly pull the blades into the formation to open the borehole, back rake angle being determined with respect to a line perpendicular to the blade profile at a particular cutting element radial location. Side rake of the cutting elements, being the angle thereof tangent to the profile or the angle thereof with respect to the radial line extending from the drilling axis through the cutting element location, may also be altered to aggressively engage the formation. The gage pad on both primary and secondary blades may be eliminated altogether, as shown on exemplary alternative primary blade 160 in FIG. 7, and cutting elements employed over the entire outer extent of the blades intended for contact with the borehole during the reaming operation. Alternatively, a very short gage pad may be employed to protect the uppermost cutting element while tripping into and out of the borehole. Material may be removed from the trailing edges of all the blades as shown at 150 on FIG. 5 to enhance clearance at pass through diameter and transition to drill diameter.

Many other additions, deletions and modifications of the invention as described and illustrated herein may be made without departing from the scope of the invention as hereinafter claimed.

What is claimed is:

1. A reaming apparatus for expanding a borehole in a subterranean formation to a larger diameter, comprising:

a body [have] *having* a longitudinal bore extending therethrough, a longitudinally extending rotational axis, and means at the top and bottom thereof for securing said body within a bottom hole assembly;

at least one primary blade for cutting said enlarged borehole diameter upon rotation of said apparatus about said rotational axis, said at least one primary blade having a longitudinal extent, protruding generally radially from said body a fixed distance and defining a cutting profile on an exterior edge thereof; and a plurality of cutting elements disposed along said primary blade cutting profile from proximate said body for cutting into said formation to expand said borehole to said larger diameter, at least some of said cutting elements being exposed beyond said cutting profile throughout substantially the entire extent of said primary blade cutting profile.

2. The apparatus of claim 1, wherein said primary blade cutting profile is arcuate at the bottom thereof, and extends outward and upward into a substantially linear gage segment which defines said larger diameter.

3. The apparatus of claim 2, wherein said at least one primary blade extends inwardly toward said body immediately above said gage segment thereof.

4. The apparatus of claim [1] *2*, wherein at least some of said cutting elements along said primary blade cutting profile gage segment include flat cutting edges oriented substantially parallel thereto.

5. The apparatus of claim 1, wherein said cutting elements comprise PDC cutting elements.

6. The apparatus of claim 5, wherein at least one of said cutting elements is set at a back rake of about 20 degrees or less.

7. The apparatus of claim 5, wherein at least one of said cutting elements is set at a neutral back rake.

8. The apparatus of claim 5, wherein at least one of said cutting elements is set at a positive back rake.

9. The apparatus of claim 5, wherein at least one of said cutting elements is set at a positive side rake.

10. The apparatus of claim 1, wherein said body is substantially tubular with a longitudinal extent substantially greater than that of said at least one primary blade, and said at least one primary blade is secured to said body along the midportion thereof.

11. The apparatus of claim 1, wherein said at least one primary blade is oriented with its longitudinal extent substantially parallel to said rotational axis.

12. The apparatus of claim 1, further including at least one longitudinally extending secondary blade protruding generally radially from said body to a lesser distance, as measured from said rotational axis, than said at least one primary blade, said at least one secondary blade being circumferentially spaced from said *at least one* primary blade about said body and defining a cutting profile, said at least one secondary blade including a plurality of cutting elements disposed along said cutting profile, at least some of said cutting elements being exposed beyond said secondary blade cutting profile.

13. The apparatus of claim 12, wherein said cutting profile of said at least one secondary blade is arcuate at the bottom thereof, and extends outward and upward into a substantially linear gage segment.

14. The apparatus of claim 13, wherein said at least one primary blade comprises a plurality of primary blades circumferentially spaced about said body.

15. The apparatus of claim 14, wherein said at least one secondary blade comprises a plurality of secondary blades circumferentially spaced about said body.

16. The apparatus of claim 14, wherein said plurality of primary blades [define] *defines* substantially the same cutting profile.

17. The apparatus of claim 15, wherein said body is substantially tubular with a longitudinal extent substantially greater than that of said primary blades, and said primary and secondary blades are secured about said body in spaced circumferential relationship along the mid-portion thereof.

*18. A reaming apparatus for expanding a borehole in a subterranean formation to a larger diameter, comprising:*

*a longitudinally extending body;*

*at least one primary blade protruding generally radially from said body, having a longitudinal extent and defining a profile on an exterior edge thereof; and*

*at least one cutting element disposed on said primary blade profile for cutting into said formation to expand said borehole to said larger diameter upon rotation of said body, said at least one cutting element being exposed beyond said profile.*

*19. The apparatus of claim 18, wherein said primary blade profile is arcuate proximate the bottom thereof, and extends outward and upward into a gage segment which defines said larger diameter.*

*20. The apparatus of claim 19, wherein said at least one primary blade extends inwardly toward said body immediately above said gage segment thereof.*

*21. The apparatus of claim 19, wherein said at least one cutting element comprises a plurality of cutting elements, and at least another of said plurality of cutting elements is disposed on said primary blade profile gage segment and includes a flat cutting edge oriented substantially parallel to a longitudinal extent of said body.*

*22. The apparatus of claim 18, wherein said at least one cutting element comprises a PDC cutting element.*

*23. The apparatus of claim 22, wherein said at least one cutting element is set at a back rake of about 20° or less.*

*24. The apparatus of claim 22, wherein said at least one cutting element is set at a neutral back rake.*

*25. The apparatus of claim 22, wherein said at least one cutting element is set at a positive back rake.*

*26. The apparatus of claim 22, wherein said at least one cutting element is set at a positive side rake.*

*27. The apparatus of claim 18, wherein said body is substantially tubular, and said at least one primary blade is secured to said body proximate a mid-portion thereof.*

*28. The apparatus of claim 18, wherein said at least one primary blade is oriented with its longitudinal extent substantially parallel to the longitudinal extent of said body.*

*29. The apparatus of claim 18, further including at least one longitudinally extending secondary blade protruding generally radially from said body to a lesser distance than said at least one primary blade, said at least one secondary blade being circumferentially spaced from said at least one primary blade on said body, defining a profile and bearing at least one cutting element disposed on said profile thereof, said at least one cutting element of said at least one secondary blade being exposed beyond said profile thereof.*

*30. The apparatus of claim 29, wherein said profile of said at least one secondary blade is arcuate proximate the bottom thereof.*

*31. The apparatus of claim 29, wherein said at least one primary blade comprises a plurality of primary blades circumferentially spaced about said body.*

*32. The apparatus of claim 31, wherein each of said plurality of primary blades defines substantially the same profile.*

*33. The apparatus of claim 31, wherein said at least one secondary blade comprises a plurality of secondary blades circumferentially spaced about said body.*

*34. The apparatus of claim 33, wherein said body is substantially tubular and said primary and secondary blades are secured about said body in spaced circumferential relationship.*

35. The apparatus of claim 29, wherein said at least one secondary blade comprises a plurality of secondary blades circumferentially spaced about said body.

36. The apparatus of claim 18, wherein said at least one primary blade comprises a plurality of primary blades circumferentially spaced about said body.

37. An apparatus for drilling and enlarging a borehole in a subterranean formation, comprising:

a pilot bit defining a first diameter;

a longitudinally extending body located above said pilot bit;

at least one primary blade protruding generally radially from said body, having a longitudinal extent, defining a profile on an exterior edge thereof and extending beyond a radius of said first diameter; and at least one cutting element disposed on said primary blade profile at a location radially outward of said first diameter for cutting into said formation to enlarge said borehole from said first diameter to a second, larger diameter upon rotation of said body, said at least one cutting element being exposed beyond said profile.

38. The apparatus of claim 37, wherein said primary blade profile is arcuate proximate a lower portion thereof.

39. The apparatus of claim 37, wherein said at least one cutting element comprises a plurality of cutting elements, at least one of said plurality of cutting elements being disposed on a radially outermost portion of said primary blade profile and including a flat cutting edge oriented substantially parallel to a longitudinal extent of said body.

40. The apparatus of claim 37, wherein said at least one cutting element comprises a PDC cutting element.

41. The apparatus of claim 40, wherein said at least one cutting element is set at a back rake of about 20° or less.

42. The apparatus of claim 40, wherein said at least one cutting element is set at a neutral back rake.

43. The apparatus of claim 40, wherein said at least one cutting element is set at a positive back rake.

44. The apparatus of claim 40, wherein said at least one cutting element is set at a positive side rake.

45. The apparatus of claim 37, wherein said body is substantially tubular and said at least one primary blade is secured to said body proximate a mid-portion thereof.

46. The apparatus of claim 37, wherein said at least one primary blade is oriented with its longitudinal extent substantially parallel to the longitudinal extent of said body.

47. The apparatus of claim 37, further including at least one longitudinally extending secondary blade protruding generally radially from said body to a lesser distance than said at least one primary blade, said at least on secondary blade being circumferentially spaced from said at least one primary blade about said body, defining a profile and bearing at least one cutting element on said profile thereof, said at least one cutting element of said at least one secondary blade being exposed beyond said profile thereof.

48. The apparatus of claim 47, wherein said profile of said at least one secondary blade is arcuate proximate the bottom thereof.

49. The apparatus of claim 46, wherein said at least one primary blade comprises a plurality of primary blades circumferentially spaced about said body.

50. The apparatus of claim 49, wherein said at least one secondary blade comprises a plurality of secondary blades circumferentially spaced about said body.

51. The apparatus of claim 50, wherein said plurality of primary blades are mutually circumferentially adjacent, and at least one of said plurality of secondary blades rotationally leads said plurality of primary blades.

52. The apparatus of claim 51, wherein at least another of said plurality of secondary blades rotationally trails said plurality of primary blades.

53. The apparatus of claim 49, wherein said plurality of primary blades are mutually circumferentially adjacent, and said at least one secondary blade rotationally leads said plurality of primary blades.

54. The apparatus of claim 53, further including at least another secondary blade rotationally trailing said plurality of primary blades.

55. The apparatus of claim 49, wherein each of said plurality of primary blades defines substantially the same profile.

56. The apparatus of claim 50, wherein said body is substantially tubular, and said primary and secondary blades are secured about said body in spaced circumferential relationship proximate a mid-portion thereof.

57. The apparatus of claim 47, wherein said at least one secondary blade comprises a plurality of secondary blades circumferentially spaced about said body.

58. The apparatus of claim 37, wherein said at least one primary blade comprises a plurality of primary blades circumferentially spaced about said body.

59. An apparatus for drilling and enlarging a borehole in a subterranean formation, comprising:

a pilot bit defining a first diameter;

a longitudinally extending body located above said pilot bit;

a first plurality of blades above said pilot bit protruding generally radially from said body beyond said first diameter, each of said first plurality of blades having a longitudinal extent and defining a profile on an exterior edge thereof; and at least one cutting element disposed on a profile of each of said plurality of primary blades at a location radially outward of said first diameter for cutting into said formation to enlarge said borehole from said first diameter to a second, larger diameter upon rotation of said body, said at least one cutting element on each primary blade being exposed beyond said profile.

60. The apparatus of claim 59, further including at least one longitudinally extending secondary blade protruding generally radially from said body to a lesser distance than said plurality of primary blades, said at least one secondary blade being circumferentially spaced from said plurality of primary blades about said body, defining a profile and bearing at least one cutting element disposed on said profile thereof, said at least one cutting element of said at least one secondary blade being exposed beyond said profile thereof.

61. The apparatus of claim 60, wherein said plurality of primary blades are mutually circumferentially adjacent, and said at least one secondary blade rotationally leads said plurality of primary blades.

62. The apparatus of claim 61, further including at least another secondary blade rotationally trailing said plurality of primary blades.

63. An apparatus for drilling and enlarging a borehole in a subterranean formation, comprising:

a pilot bit defining a first diameter;

a longitudinally extending body located above said pilot bit;

at least one primary blade above said pilot bit protruding generally radially from said body beyond said first diameter to a second diameter, said at least one primary blade having a longitudinal extent and defining a profile on an exterior edge thereof; and

*at least one secondary blade above said pilot bit protruding generally radially from said body to a diameter intermediate said first diameter and said second diameter, said at least one secondary blade having a longitudinal extent and defining a profile on an exterior edge thereof.*

*64. The apparatus of claim 63, wherein said at least one secondary blade rotationally leads said at least one primary blade.*

*65. The apparatus of claim 63, wherein said at least one secondary blade rotationally trails said at least one primary blade.*

*66. The apparatus of claim 63, wherein said at least one primary blade comprises a plurality of circumferentially-spaced, mutually adjacent primary blades.*

*67. The apparatus of claim 66, wherein said at least one secondary blade rotationally leads said plurality of primary blades.*

*68. The apparatus of claim 67, further including at least another secondary blade rotationally trailing said plurality of primary blades.*

*69. The apparatus of claim 63, further including at least one cutting element disposed on a profile of each of said blades at a location radially outward of said first diameter for cutting into said formation to enlarge said borehole from said first diameter to a second, larger diameter upon rotation of said body, said cutting elements being exposed beyond said profiles.*

*70. An apparatus for drilling and enlarging a borehole in a subterranean formation, comprising:*

*a pilot bit defining a first diameter;*

*a longitudinally extending body located above said pilot bit;*

*at least one primary blade above said pilot bit protruding generally radially from said body beyond said first diameter to a second diameter; and*

*at least one secondary blade above said pilot bit protruding generally radially from said body to a diameter intermediate said first diameter and said second diameter;*

*wherein said body and said protrusions of said at least one primary blade and said at least one secondary blade therefrom lie within a pass-through diameter larger than said first diameter and smaller than said second diameter.*

*71. The apparatus of claim 70, wherein said first diameter lies within said pass-through diameter.*

*72. An apparatus for enlarging a borehole of a first diameter in subterranean formation, comprising:*

*a longitudinally extending body;*

*at least one primary blade protruding generally radially from said body beyond said first diameter to a second diameter; and*

*at least one secondary blade protruding generally radially from said body to a diameter intermediate said first diameter and said second diameter;*

*wherein said body and protrusions of said at least one primary blade and said at least one secondary blade therefrom lie within a pass-through diameter larger than said first diameter and smaller than said second diameter.*

*73. A method for enlarging a borehole of a first diameter to a second diameter in a subterranean formation, comprising:*

*rotating a first cutting structure about a center of said second diameter to cut formation material adjacent said borehole to enlarge said borehole to a diameter larger than said first diameter and smaller than said second diameter; and*

*rotating a second cutting structure about said center of said second diameter to cut formation material adjacent said borehole to enlarge said borehole to said second diameter.*

*74. The method of claim 73, further including drilling said borehole to said first diameter prior to said enlarging employing a third cutting structure simultaneously rotated with said first and second cutting structures.*

*75. The method of claim 73, further including drilling a longitudinal segment of said enlarged, second diameter borehole using said first and second cutting structures, while only contacting formation material laterally adjacent said borehole near said second diameter with said second cutting structure.*

* * * * *